US009239675B2

(12) United States Patent
Ogawa et al.

(10) Patent No.: US 9,239,675 B2
(45) Date of Patent: Jan. 19, 2016

(54) INPUT DISPLAY APPARATUS AND METHOD, IMAGE FORMING APPARATUS, IMAGING APPARATUS, AND COMPUTER READABLE MEDIUM

(75) Inventors: Hirofumi Ogawa, Kanagawa (JP); Kazunori Ozeki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 410 days.

(21) Appl. No.: 13/361,463

(22) Filed: Jan. 30, 2012

(65) Prior Publication Data

US 2013/0050726 A1 Feb. 28, 2013

(30) Foreign Application Priority Data

Aug. 22, 2011 (JP) ................. 2011-180242

(51) Int. Cl.
G06F 3/12 (2006.01)
G06F 3/0488 (2013.01)
H04N 1/00 (2006.01)
H04N 1/21 (2006.01)
H04N 101/00 (2006.01)

(52) U.S. Cl.
CPC .......... *G06F 3/04883* (2013.01); *H04N 1/0044* (2013.01); *H04N 1/00204* (2013.01); *H04N 1/00384* (2013.01); *H04N 1/00411* (2013.01); *H04N 1/00482* (2013.01); *H04N 1/00493* (2013.01); *H04N 1/00973* (2013.01); *H04N 1/2112* (2013.01); *H04N 2101/00* (2013.01); *H04N 2201/0039* (2013.01); *H04N 2201/0074* (2013.01); *H04N 2201/0084* (2013.01); *H04N 2201/0094* (2013.01); *H04N 2201/0096* (2013.01)

(58) Field of Classification Search
USPC .................................. 358/1.13, 1.1
See application file for complete search history.

(56) References Cited

U.S. PATENT DOCUMENTS

2006/0075363 A1* 4/2006 Mizoguchi .................... 715/863
2011/0019058 A1* 1/2011 Sakai et al. ............. 348/333.01
2011/0157636 A1* 6/2011 Maeda .......................... 358/1.15

FOREIGN PATENT DOCUMENTS

| JP | 6-242885 A | 9/1994 |
| JP | 1994289984 A | 10/1994 |
| JP | 2007-300353 A | 11/2007 |
| JP | 2010134859 A | 6/2010 |
| JP | 2011-028345 A | 2/2011 |
| JP | 2011138237 A | 7/2011 |
| JP | 2011-118725 | 6/2014 |

OTHER PUBLICATIONS

Office Action issued by the Japanese Patent Office in corresponding Japanese Patent Application No. 2011180242 dated Sep. 10, 2013.
Japanese Office Action (Notification of Reason for Refusal) issued Jan. 23, 2014 in Japanese patent application 2011-180242.
Japanese Office Action (Notification of Reason for Refusal) issued Mar. 3, 2015, in Japanese patent application 2014-028652.

* cited by examiner

*Primary Examiner* — Martin Mushambo
(74) *Attorney, Agent, or Firm* — Sughrue Mion, PLLC

(57) ABSTRACT

An input display apparatus includes the following elements. A display unit has a display area. A receiver receives plural types of gestures which are performed on the display area. A setting unit sets plural settings for an apparatus in accordance with the types of gestures received by the receiver. A display controller controls the display unit to display at least one of the plural settings and gesture guidance information for guiding an input of a gesture which is associated with the setting to be displayed.

16 Claims, 18 Drawing Sheets

FIG. 10
| GESTURE INPUT GUIDANCE ITEMS | SETTING CONTENT GUIDANCE ITEMS | SETTING CONTENT ITEMS |
|---|---|---|
|  |  | DUPLEX PRINTING (SHORT-EDGE BINDING) |
|  |  | DUPLEX PRINTING (LONG-EDGE BINDING) |
| 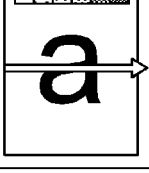 | 1  2 | PRINT TWO PAGES PER SHEET |
| 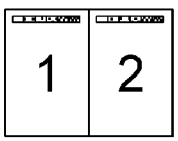 | 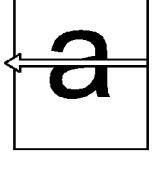 | BOOKLET PRINTING |
| 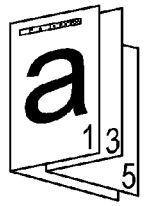 |  | CHANGE DOCUMENT ORIENTATION |
|  | A4 ↓ B4 A3 | CHANGE (ENLARGE) PAPER SIZE |
|  | A4 ↓ B5 A5 | CHANGE (SHRINK) PAPER SIZE |

FIG. 17

| GESTURE INPUT GUIDANCE ITEMS | SETTING CONTENT GUIDANCE ITEMS | SETTING CONTENT ITEMS |
|---|---|---|
| 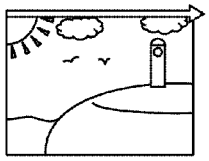 | ISO 100 | SET ISO SPEED TO 100 |
| 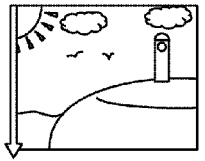 | WB 5600 K | SET WHITE BALANCE TO 5600 K |
| 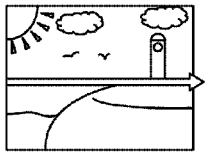 |  | SET CHARACTER IMAGE-CAPTURING MODE |
| 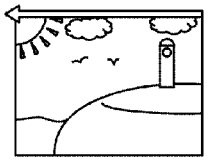 | ISO 3200 | SET ISO SPEED TO 3200 |
| 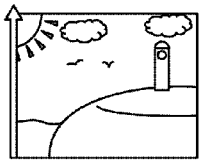 | WB 6300 K | SET COLOR TEMPERATURE TO 6300 K |
| 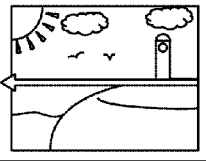 |  | SET LANDSCAPE IMAGE-CAPTURING MODE |
|  | 3 MILLION PIXELS ↓ 12 MILLION PIXELS | CHANGE NUMBER OF PIXELS (HIGH RESOLUTION) |
| 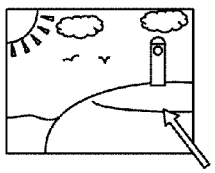 | 12 MILLION PIXELS ↓ 3 MILLION PIXELS | CHANGE NUMBER OF PIXELS (LOW RESOLUTION) |

…
INPUT DISPLAY APPARATUS AND METHOD, IMAGE FORMING APPARATUS, IMAGING APPARATUS, AND COMPUTER READABLE MEDIUM

CROSS-REFERENCE TO RELATED APPLICATIONS

This application is based on and claims priority under 35 USC 119 from Japanese Patent Application No. 2011-180242 filed Aug. 22, 2011.

BACKGROUND

Technical Field

The present invention relates to an input display apparatus and method, an image forming apparatus, an imaging apparatus, and a computer readable medium.

SUMMARY

According to an aspect of the invention, there is provided an input display apparatus including the following elements. A display unit has a display area. A receiver receives plural types of gestures which are performed on the display area. A setting unit sets plural settings for an apparatus in accordance with the types of gestures received by the receiver. A display controller controls the display unit to display at least one of the plural settings and gesture guidance information for guiding an input of a gesture which is associated with the setting to be displayed.

BRIEF DESCRIPTION OF THE DRAWINGS

Exemplary embodiment(s) of the present invention will be described in detail based on the following figures, wherein:

FIG. 10 is a table indicating an example of relationships among gesture input guidance items, setting content guidance items, and the contents of settings;

FIG. 17 is a table indicating an example of relationships among gesture input guidance items, setting content guidance items, and the contents of settings.

DETAILED DESCRIPTION

A first exemplary embodiment of the invention will be described in detail below with reference to the accompanying drawings.

Figure 1:
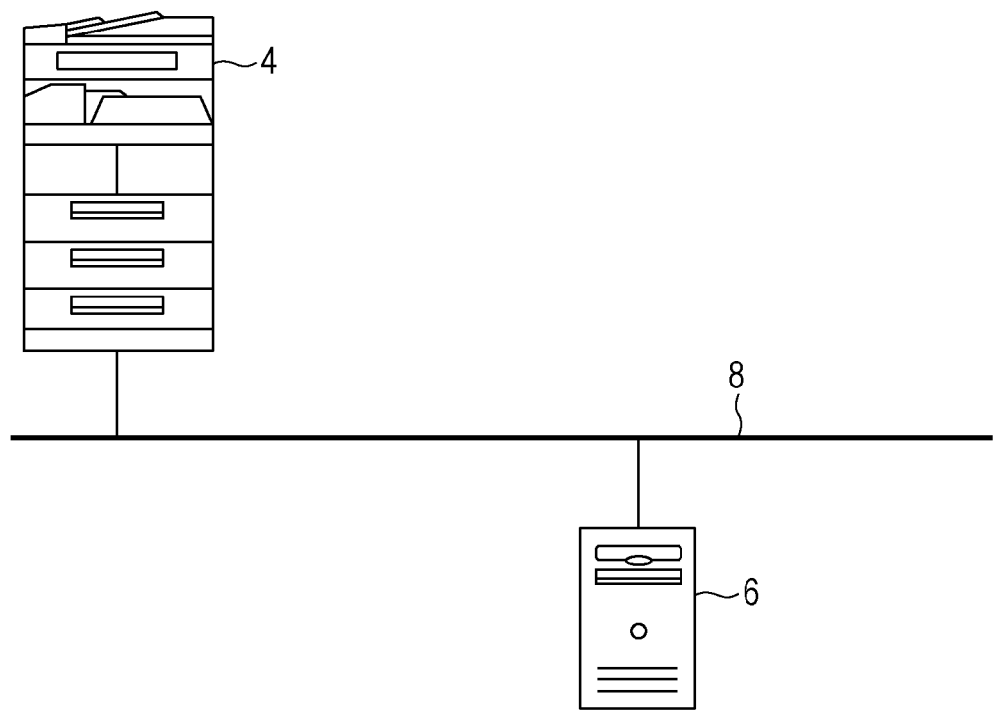
FIG. 1 is a schematic view illustrating the configuration of an information processing system according to a first exemplary embodiment of the invention.

FIG. 1 is a schematic view illustrating an information processing system 2 according to the first exemplary embodiment. The information processing system 2, as shown in FIG. 1, includes an image forming apparatus 4 and an information processing apparatus 6 connected to each other via a communication line 8. A desired number of image forming apparatuses 4 and a desired number of information processing apparatuses 6 may be set in the information processing system 2.

Figure 2:
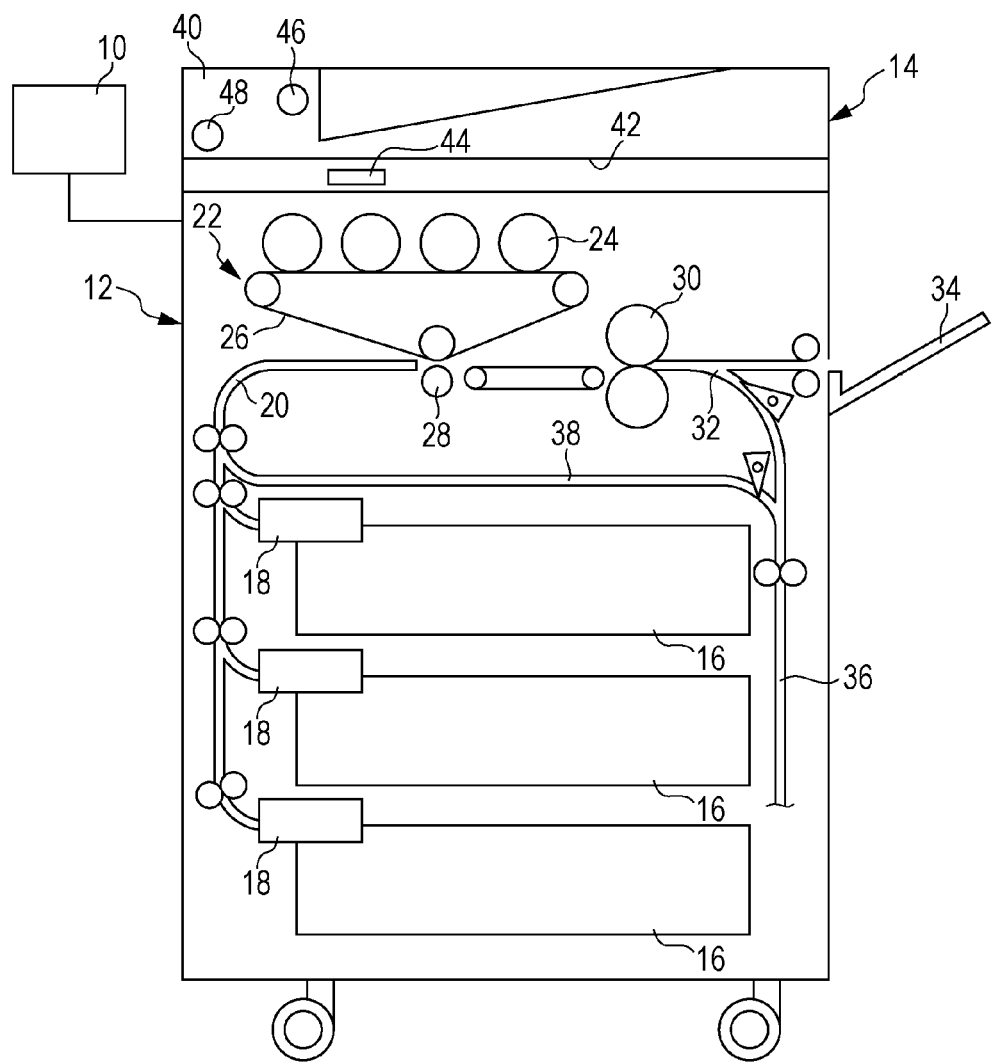
FIG. 2 is a sectional view illustrating an image forming apparatus which forms the information processing system according to the first exemplary embodiment.

FIG. 2 is a sectional view illustrating the image forming apparatus 4.

The image forming apparatus 4 includes a user interface device 10, a printer 12, and an image reading device 14.

The user interface device 10 may be provided integrally with the image forming apparatus 4 or may be connected to the image forming apparatus 4 via a communication line. The user interface device 10 may be formed as a touch panel. In this case, the user interface device 10 displays information in a display section of the touch panel, or receives an input made by an operator as a result of specifying a position within a display area of the display section.

The printer 12 includes, for example, three recording-medium supply cassettes 16 and associated supply heads 18.

When one of the recording-medium supply cassettes 16 is selected, the associate supply head 18 is operated to supply a recording medium from the selected recording-medium supply cassette 16 to an image forming mechanism 22 through a recording-medium supply channel 20.

The image forming mechanism 22 includes photoconductors 24 of individual colors, such as yellow (Y), magenta (M), cyan (C), and black (K), and an intermediate transfer belt 26.

Various components, such as a charging device, an exposure device, a developing device, a first transfer device, a cleaning device, etc. (none of which are shown), are disposed around each of the photoconductors 24. Toner images formed on the individual photoconductors 24 are transferred onto the intermediate transfer belt 26. When monochrome printing is specified, the image forming mechanism 22 is set such that only the photoconductor 24 and associated devices corresponding to black are operable.

A synthesized toner image on the intermediate transfer belt 26 is transferred onto a recording medium, which has been supplied from the recording-medium supply cassette 16, by using a second transfer roller 28, and is then fixed by using a fixing device 30. Then, the recording medium on which the toner image is fixed is discharged to a discharge unit 34 via a recording-medium discharge channel 32.

If duplex printing is specified, a recording medium on which a toner image is fixed by using the fixing device 30 is supplied to a reversing device 36 from the recording-medium discharge channel 32. Then, the side of the recording medium is reversed by the reversing device 36. The reversed recording medium is returned to the recording-medium supply channel 20 via a recording-medium reversal channel 38. The recording medium is again supplied to the image forming mechanism 22, and the reverse side of the recording medium is printed.

The image reading device 14 includes an automatic document feeder 40 that is operable to read single-sided documents and double-sided documents. A document is supplied to a platen 42 by the automatic document feeder 40, and an image of the document is read on the platen 42 by a reader 44, such as a charge coupled device (CCD).

The image reading device 14 also includes a document set detector 46 for detecting whether a document is set on the automatic document feeder 40. The automatic document feeder 40 also serves as a platen cover, and by opening this platen cover, a document can be placed on the platen 42. The opening/closing of the platen cover is detected by a platen-cover opening/closing detector 48.

The image forming apparatus 4 includes a communication device (not shown) connected to the communication line 8, such as a local area network (LAN). By using the communication device provided for the image forming apparatus 4, print data sent from the information processing apparatus 6, which will be discussed later, can be printed. The image forming apparatus 4 may also include a fax modem connected to a public line and thereby has a fax function (not shown).

Figure 3:
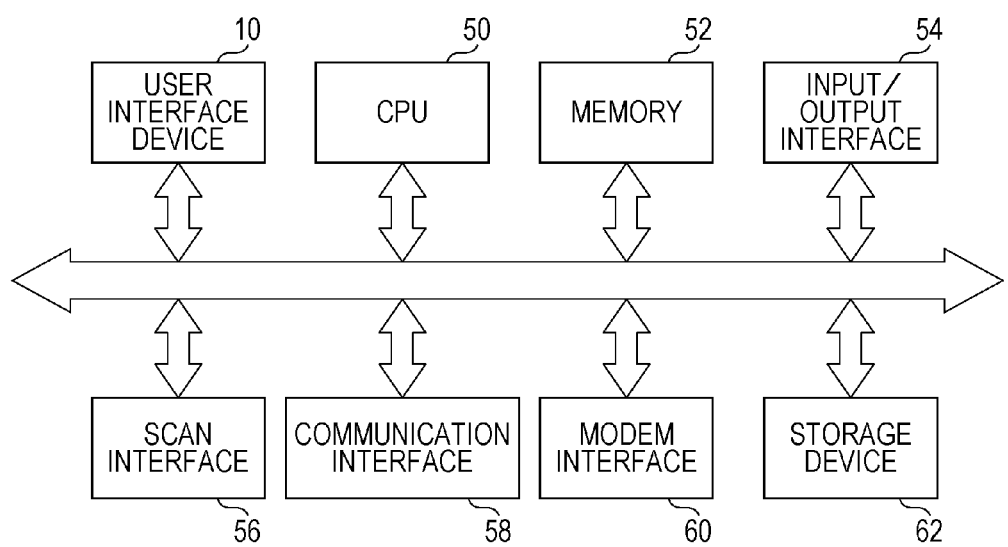
FIG. 3 is a block diagram illustrating a hardware configuration of the image forming apparatus.

FIG. 3 is a block diagram illustrating a hardware configuration of the image forming apparatus 4.

The image forming apparatus 4 includes, as shown in FIG. 3, the user interface device 10, a central processing unit (CPU) 50, a memory 52, an input/output interface 54, a scan interface 56, a communication interface 58, a fax modem interface 60, and a storage device 62, which are connected to one another via a bus.

Part of the image forming apparatus 4 serves as a computer that can communicate with the information processing apparatus 6 and other apparatuses.

The CPU 50 controls the individual circuits by executing programs, e.g., an information processing program 64, which will be discussed later, that are written into the memory 52 or the storage device 62. An input received through the user interface device 10 is transmitted to the CPU 50 and is processed. Then, display information is transmitted to the user interface device 10.

The CPU 50 may execute the information processing program 64 stored in a storage medium, such as a compact disc read-only memory (CD-ROM), or may execute the information processing program 64 provided via the communication interface 58, which will be discussed later.

The input/output interface 54 receives a document set detection signal from the document set detector 46 shown in FIG. 2 and a platen-cover opening/closing signal from the platen-cover opening/closing detector 48 shown in FIG. 2.

The scan interface 56 is connected to the image reading device 14 shown in FIG. 2 and receives a signal from the image reading device 14.

The communication interface 58 is connected to a communication device provided for the image forming apparatus 4 and receives print data from the information processing apparatus 6 connected to the image forming apparatus 4 via the communication line 8.

The modem interface 60 is connected to a fax modem provided for the image forming apparatus 4 and thereby implements a fax function.

The user interface device 10 or the information processing program 64, which will be discussed later, is an example of the input display apparatus.

Figure 4:
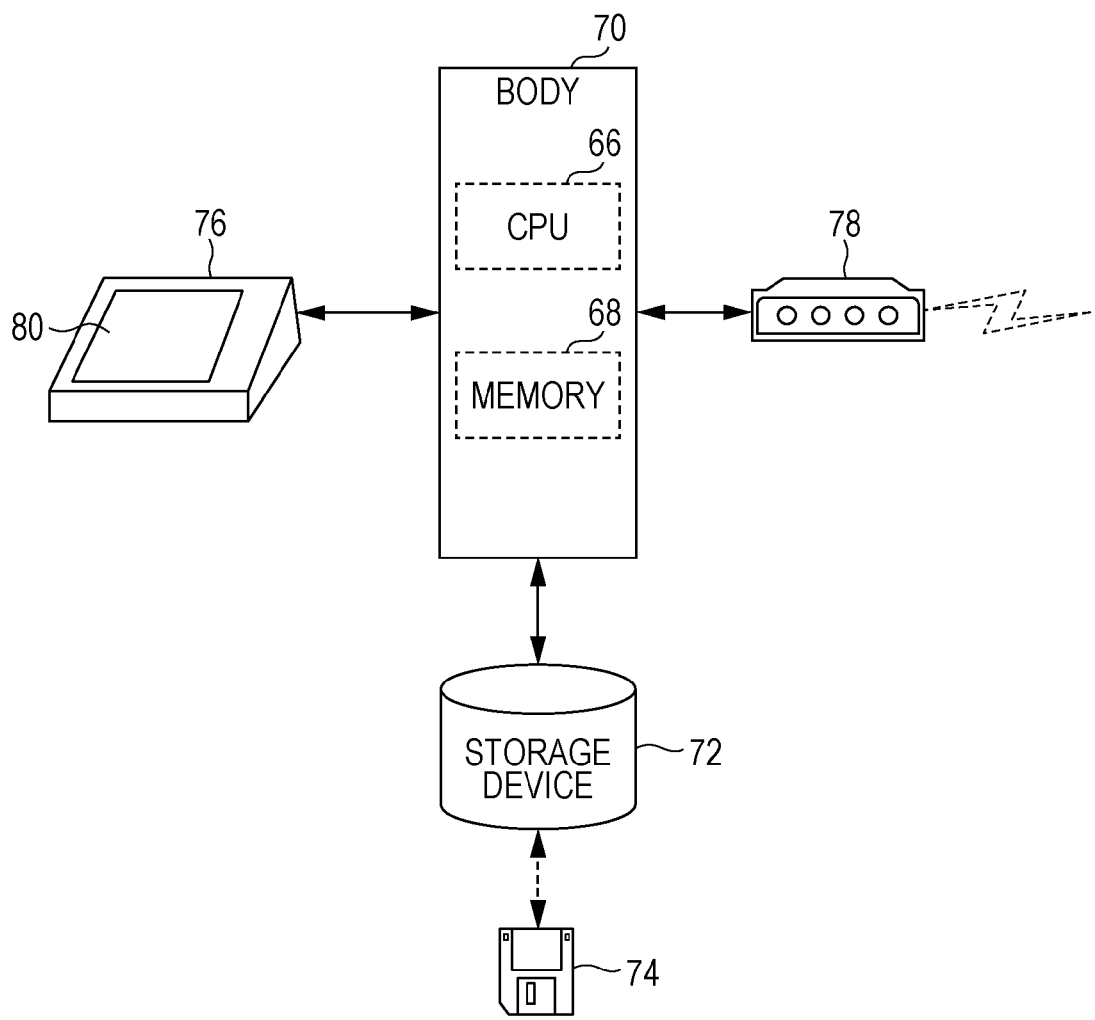
FIG. 4 is a schematic view illustrating a hardware configuration of an information processing apparatus which forms the information processing system according to the first exemplary embodiment.

The information processing apparatus 6 will now be described below. FIG. 4 is a schematic view illustrating a hardware configuration of the information processing apparatus 6.

Figure 6:
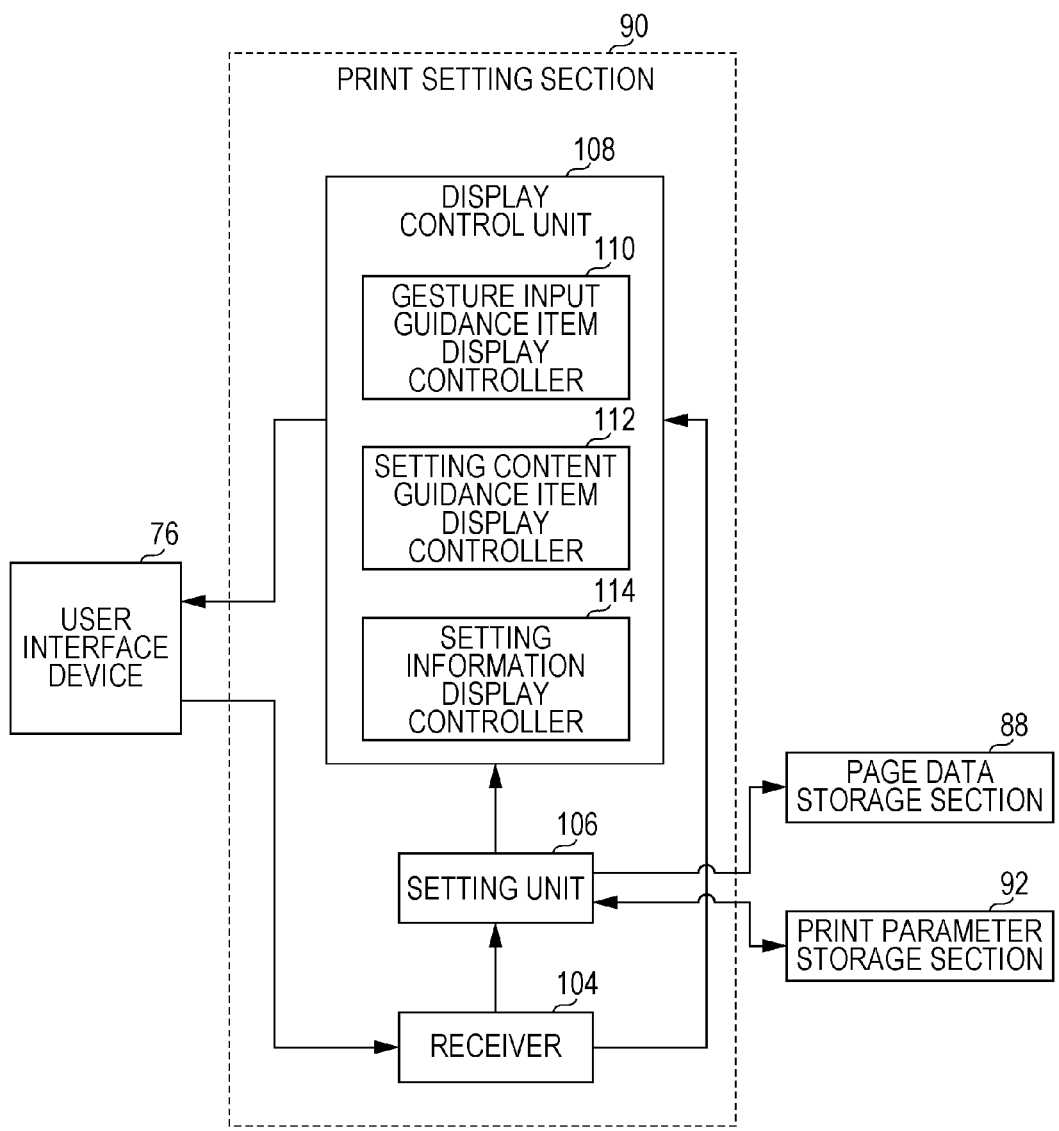
FIG. 6 is a block diagram illustrating an information processing program forming a print setting section.

The information processing apparatus 6 includes, as shown in FIG. 6, a body 70 including a CPU 66, a memory 68, etc., a storage device 72, a storage medium 74, a user interface device 76, and a communication interface 78. Part of the information processing apparatus 6 serves as a computer that can communicate with other apparatuses.

The CPU 66 executes processing based on the information processing program 64, which will be discussed later, stored in the memory 68. The storage device 72 is, for example, a built-in hard disk drive (HDD), and the storage medium 74 is, for example, a CD, a floppy disk (FD), or an external HDD. The CPU 66 may execute the information processing program 64 stored in the storage device 72 or the storage medium 74.

As in the user interface device 10 provided for the image forming apparatus 4, the user interface device 76 is formed as a touch panel. In this case, the user interface device 76 displays information in a display section 80 of the touch panel, or receives an input made by an operator as a result of specifying a position within a display area of the display section 80.

The communication interface 78 is connected to the communication interface 58 of the image forming apparatus 4 via the communication line 8, and outputs data, such as print data, to the image forming apparatus 4.

The user interface device 76 or the information processing program 64, which will be discussed later, is an example of the input display apparatus.

Print settings to be set in the information processing system 2 configured as described above will be described below.

Figure 5:
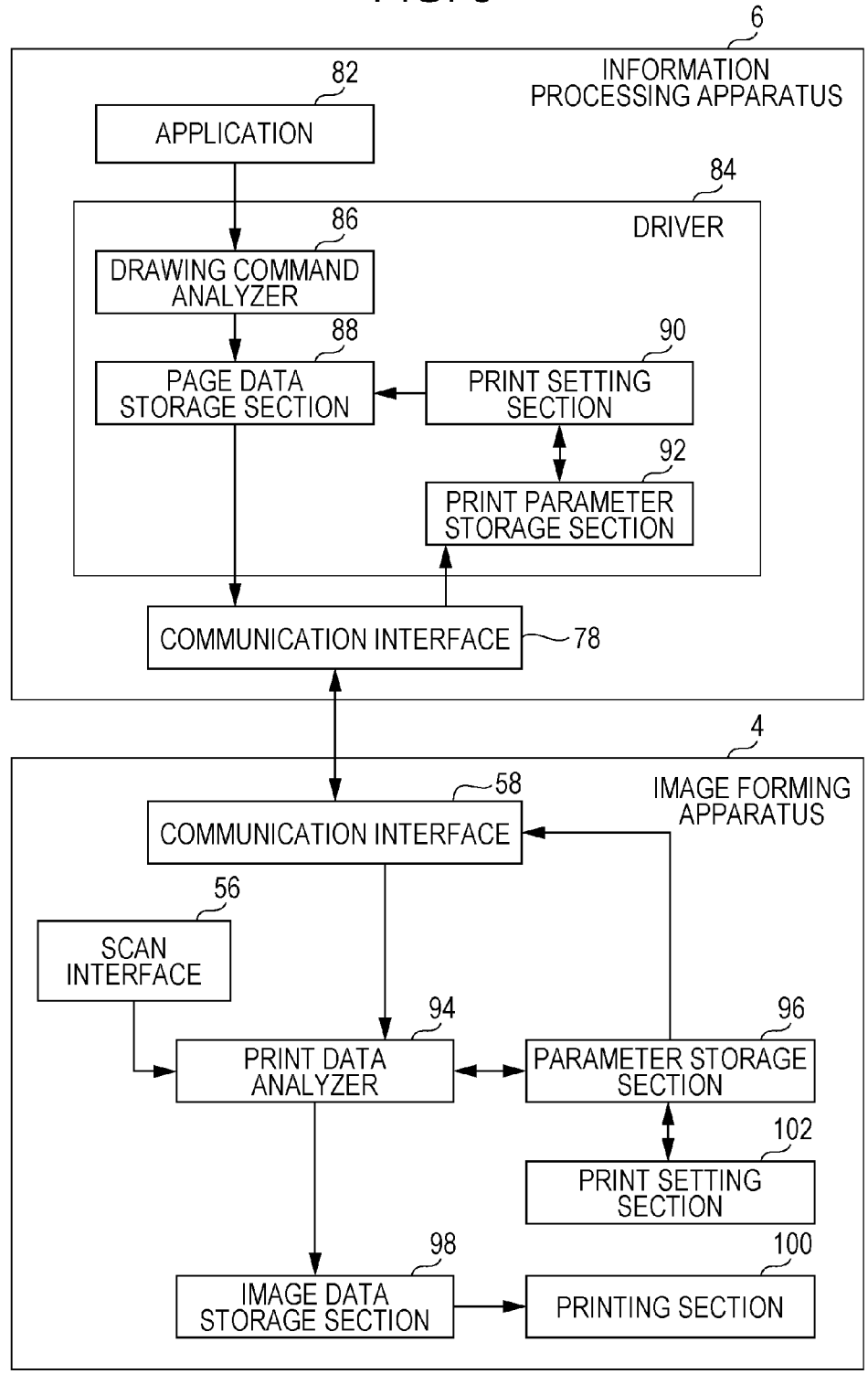
FIG. 5 is a block diagram illustrating a functional configuration of the information processing system.

FIG. 5 is a block diagram illustrating a functional configuration of the information processing system 2.

The information processing apparatus 6 makes a print request by sending print data to the image forming apparatus 4. The information processing apparatus 6 includes an application 82, a driver 84, and the communication interface 78.

The application 82, which is software for generating drawing commands (drawing instructions), is stored, for example, in the memory 68, and is executed by the CPU 66.

The driver 84 includes a drawing command analyzer 86, a page data storage section 88, a print setting section 90, and a print parameter storage section 92. The drawing command analyzer 86 analyzes a drawing command sent from the application 82 and processes the drawing command into page data. The page data storage section 88 stores page data. The print setting section 90 has a function of setting print settings intended by an operator. The print parameter storage section 92 stores print setting information concerning print settings set by the print setting section 90 and information concerning print settings obtained from the image forming apparatus 4. Details of the print setting section 90 will be given later.

As stated above, the communication interface 78 is an interface which is provided for the information processing apparatus 6 and which connects the information processing apparatus 6 with the image forming apparatus 4. The type of communication interface 78 is not particularly restricted, and may be a universal serial bus (USB) port or a network port. Print data, which is page data reflecting the print settings set by the print setting section 90, is output to the image forming apparatus 4 via the communication interface 78.

The image forming apparatus 4 performs printing on the basis of print data sent from the information processing apparatus 6. The image forming apparatus 4 also prints images read by the image reading device 14.

The image forming apparatus 4 includes the communication interface 58, the scan interface 56, a print data analyzer 94, a parameter storage section 96, an image data storage section 98, a printing section 100, and a print setting section 102.

As stated above, the communication interface 58 is an interface which is provided for the image forming apparatus 4 and which connects the image forming apparatus 4 with the information processing apparatus 6. The type of communication interface 58 is not particularly restricted, and may be a USB port or a network port. Print data is input into the image forming apparatus 4 via the communication interface 58.

As stated above, the scan interface 56 receives from the image reading device 14 an image signal obtained as a result of reading an image by the image reading device 14.

The print data analyzer 94 analyzes print data input through the communication interface 58. The image data storage section 98 stores data analyzed by the print data analyzer 94. The printing section 100 has a function of printing data stored in the image data storage section 98, and more specifically, the printing section 100 performs printing by using the printer 12 on the basis of the contents of print settings set by the print setting section 90 or the print setting section 102.

The print setting section 102 has a function similar to that of the print setting section 90 of the information processing apparatus 6. When printing print data representing images read by the image reading device 14, which has been obtained by the scan interface 56, the print setting section 102 has a function of setting print settings desired by an operator. However, the print setting section 102 may also has a function of setting print settings desired by an operator concerning print data sent from the information processing apparatus 6.

The parameter storage section 96 stores print setting information concerning print settings set by the print setting section 102 and information concerning print settings stored in the image forming apparatus 4.

Details of the print setting section 90 of the information processing apparatus 6 will be given below. FIG. 6 is a block diagram illustrating the information processing program 64 forming the print setting section 90. The configuration of the print setting section 102 of the image forming apparatus 4 is similar to that of the print setting section 90, and an explanation thereof will thus be omitted.

The information processing program 64 includes a receiver 104, a setting unit 106, and a display control unit 108.

The receiver 104 receives position information from the user interface device 76. In an example of this exemplary embodiment, the receiver 104 receives position information indicating a specified position within a display area of the display section 80 of the user interface device 76 which is formed as a touch panel.

The setting unit 106 sets the contents of settings corresponding to position information input from the receiver 104 as the contents of print settings, and outputs the contents of print settings to the page data storage section 88 and the print parameter storage section 92 as print setting information. In the case of the print setting section 102 of the image forming apparatus 4, the contents of print settings are output to the parameter storage section 96.

The display control unit 108 includes a gesture input guidance item display controller 110, a setting content guidance item display controller 112, and a setting information display controller 114. The gesture input guidance item display controller 110 and the setting content guidance item display controller 112 perform control so that guidance information, which will be discussed below, is displayed in the display section 80 of the user interface device 76. The setting information display controller 114 performs control so that information indicating the contents of settings currently set by the setting unit 106 is displayed in the display section 80. In the case of the display control unit 108 of the image forming apparatus 4, the above-described information is displayed in the display section of the user interface device 10.

Before describing the receiver 104, the user interface device 76 that outputs position information to the receiver 104 will first be discussed below.

Figure 7:
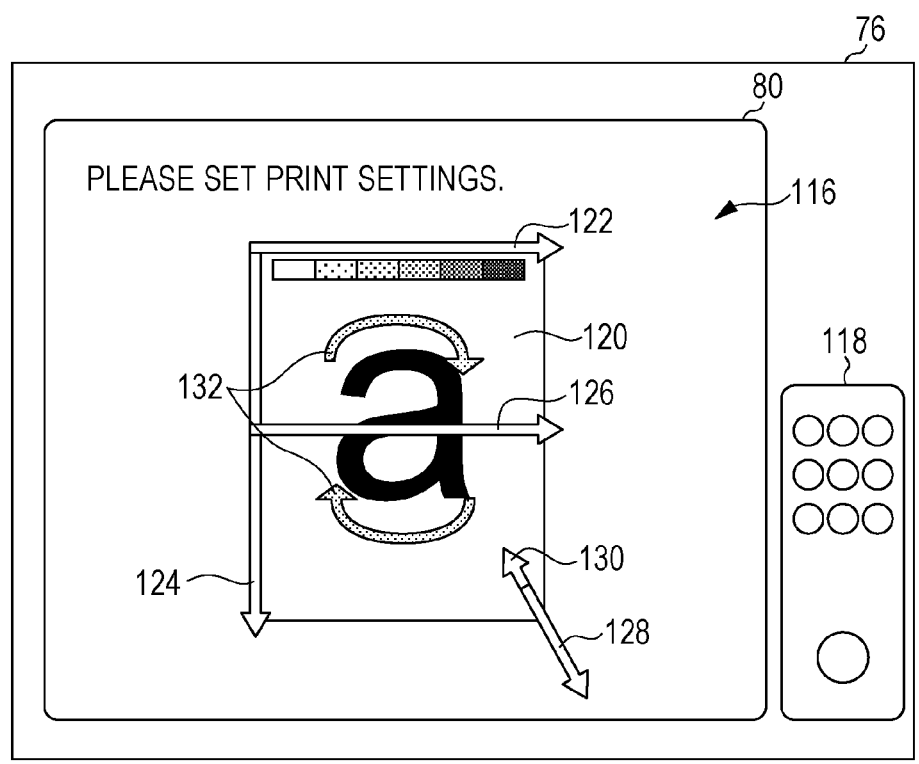
FIG. 7 is a plan view illustrating a user interface device of the information processing apparatus.

FIG. 7 is a plan view illustrating the user interface device 76 of the information processing apparatus 6. A description will be given below by taking the information processing apparatus 6 by way of example, however, the same applies to the image forming apparatus 4.

As shown in FIG. 7, the user interface device 76 includes the display section 80. Information is displayed within a display area 116 of the display section 80. In the example shown in FIG. 7, a preview screen, which is displayed before a printing operation, is displayed within the display area 116. When setting print settings, the display control unit 108 displays an initial screen, such as that shown in FIG. 7. The display section 80 also allows an operator to specify a position within the display area 116, and thus, the display section 80 serves as an input section. Specifying of a position within the display area 116 is performed by an operator's gesture. For example, an operator touches the display area 116 with a finger or a pen to specify a position.

The term "gesture" refers to an operation for continuously specifying positions or an operation for discontinuously specifying positions performed by an operator. For example, in the above-described example, the operator touches any position within the display area 116 with a finger and moves the finger within the display area 116 so as to input position information indicating a trail made by the movement of the finger. Alternatively, the operator touches any position within the display area 116 with a finger and then moves the finger off the display area 116 without moving the finger along the display area 116 so as to input position information indicating a point. The position information indicates, for example, coordinates within the display area 116.

The user interface device 76 may include, as shown in FIG. 7, not only the display section 80, but also a button input section 118 that allows an operator to input positions with buttons.

Upon an operator starting to perform a gesture on the user interface device 76, the receiver 104 stores information indicating the start of a gesture. In this exemplary embodiment, the receiver 104 sets a setting flag to store information indicating the start of a gesture.

The receiver 104 receives position information indicating a gesture performed on the user interface device 76 as described above, and outputs the position information to the gesture input guidance item display controller 110, which will be discussed later. Upon eth operator completing of performing of a gesture on the user interface device 76, the receiver 104 outputs position information concerning the gesture to the setting unit 106.

The setting unit 106 will be discussed in detail below.

The setting unit 106 sets the contents of print settings on the basis of the position information received from the receiver 104. The contents of settings include "duplex printing (short edge binding)", "duplex printing (long edge binding)", "print two pages per sheet", "booklet printing", "change document orientation", "change (enlarge) paper size", "change (shrink) paper size", etc.

Predetermined position information is associated with each of the contents of the above-described settings. The setting unit 106 compares the position information received from the receiver 104 with the predetermined position information.

Specific examples of the relationships between the contents of settings and individual items of predetermined position information will be discussed below.

As a result of comparison, the setting unit 106 selects an item of predetermined position information that may be associated with the position information received from the receiver 104, and sets the associated content of setting for the selected item of predetermined position information. In this case, if the degree by which the position information received from the receiver 104 matches a certain item of predetermined position information exceeds a reference value, the setting unit 106 determines that that item of predetermined position information may be associated with the received position information.

The setting unit 106 also outputs the contents of current settings to the setting information display controller 114 as print setting information.

The display control unit 108 will be discussed in detail below.

The setting information display controller 114 obtains print setting information from the setting unit 106, and displays the setting status of the current print settings. The setting information display controller 114 displays, for example, an image 120 corresponding to print setting information shown in FIG. 7.

The gesture input guidance item display controller 110 performs control so that gesture input guidance items 122 through 132, for example, are displayed. The "gesture input guidance" refers to information (guidance lines) for assisting an operator to input a gesture, and more specifically, information indicating a trail (position information) of a gesture for setting a setting. For example, each gesture input guidance item is indicated by an arrow, as shown in FIG. 7. In this case, when the operator inputs a gesture from the tail to the head of an arrow, the setting unit 106 sets the content of a setting associated with the gesture input by the operator.

The input guidance item 132 shown in FIG. 7 is used for giving guidance on a multi-touch gesture and is indicated in a color different from that of the other gesture input guidance items. The term "multi-touch gesture" refers to a gesture with which setting is performed through an input of an operation for specifying plural positions at the same time. Upon input of position information (plural trails) corresponding to the gesture input guidance item 132 from the receiver 104, the setting unit 106 sets a setting, for example, a "change document orientation" setting shown in FIG. 10, associated with the gesture input guidance item 132.

The gesture input guidance item display controller 110 generates an effective gesture list and displays input guidance items in accordance with the generated effective gesture list. The effective gesture list is a list of gestures associated with settings that have been extracted from a current print setting status.

The gesture input guidance item display controller 110 obtains print setting information, which is information indicating a current setting status, from the setting unit 106, and generates an effective gesture list on the basis of the print setting information. For example, if the maximum sheet size is currently set, the effective gesture list does not contain a "change (enlarge) paper size" setting. That is, the gesture input guidance item 128 associated with this setting content is not displayed. The gesture input guidance item display controller 110 displays gesture input guidance items corresponding to gestures (position information) contained in the generated effective gesture list in the display section 80.

Additionally, upon receiving position information from the receiver 104 (when there is an input on the touch panel from an operator), the gesture input guidance item display controller 110 removes gestures that are not associated with the received position information from the effective gesture list.

Figure 8:
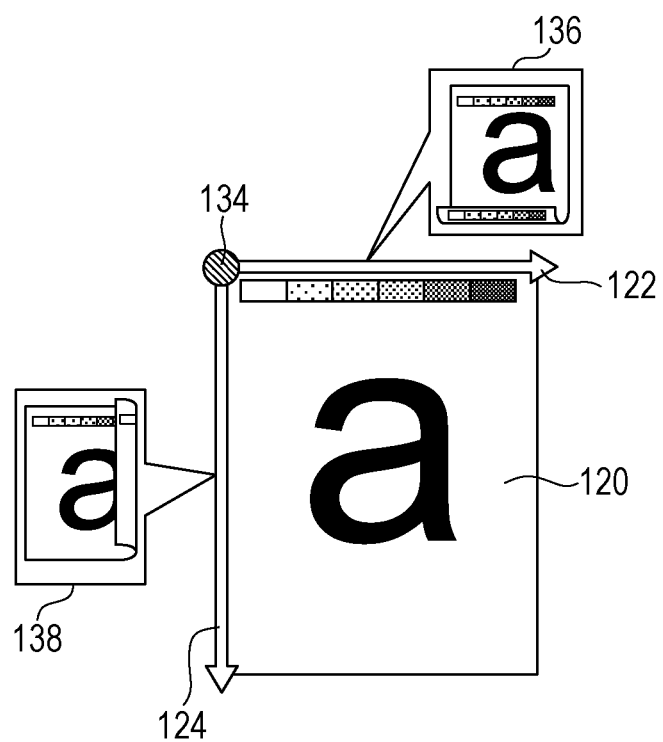
FIG. 8 is a plan view illustrating an example of gesture input guidance items displayed in accordance with an effective gesture list generated based on position information obtained from a receiver.

FIG. 8 is a plan view illustrating an example of gesture input guidance items displayed in accordance with an effective gesture list generated based on position information obtained from the receiver 104. In FIG. 8, a touch position 134 is a position input by an operator. In the example shown in FIG. 8, gesture input guidance items 122 and 124 are displayed in association with a gesture performed by using the touch position 134 as position information. In association with the gesture input guidance items 122 and 124, setting content guidance items 136 and 138, respectively, are displayed. Details of the setting content guidance items 136 and 138 will be given below.

The gesture input guidance item display controller 110 may remove gestures which are less frequently used than other gestures from the effective gesture list.

The gesture input guidance item display controller 110 may remove gestures other than gestures which have already been set as display targets from the effective gesture list. The display targets may be set by, for example, an operator, and the gesture input guidance item display controller 110 displays gestures that have been set as display targets.

Figure 9:
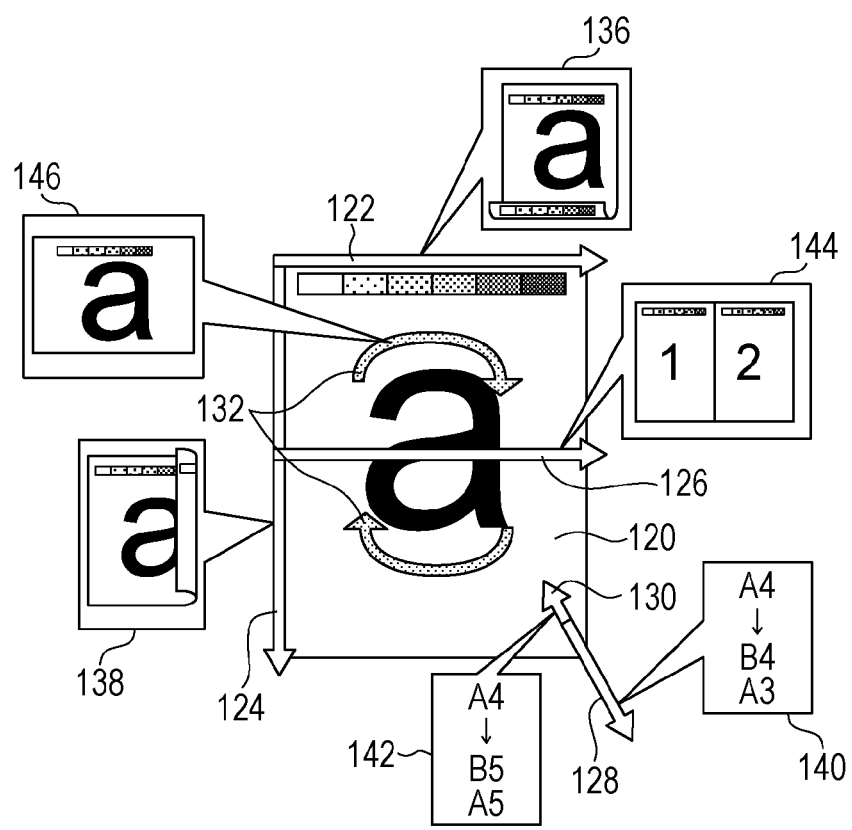
FIG. 9 is a plan view illustrating examples of setting content guidance items displayed in accordance with a setting content guidance list.

The setting content guidance item display controller 112 performs control so that setting content guidance items are displayed together with gesture input guidance items displayed by the gesture input guidance item display controller 110. The setting content guidance items are information indicating the setting contents of the gesture input guidance items, and are displayed as, for example, setting content guidance items 136 through 146 shown in FIG. 9. The setting content guidance items 136 through 146 indicate print setting statuses when the associated input guidance items are set.

The setting content guidance item display controller 112 generates a setting content guidance list and displays setting content guidance items in accordance with the generated setting content guidance list. The setting content guidance list is a list of setting content guidance items associated with gesture input guidance items which are displayed by the gesture input guidance item display controller 110 as display targets.

The setting content guidance item display controller 112 generates a setting content guidance list on the basis of an effective gesture list generated by the gesture input guidance item display controller 110. The setting content guidance item display controller 112 displays setting content guidance items in accordance with the generated setting content guidance list.

If the gesture input guidance item display controller 110 has not obtained position information from the receiver 104, the setting content guidance item display controller 112 may perform setting so that display setting content guidance items are not displayed. Such a setting may be performed by, for example, an operator, and if the gesture input guidance item display controller 110 has not obtained position information from the receiver 104, the setting content guidance item display controller 112 determines, based on the setting set by the operator, whether to display setting content guidance items.

FIG. 10 is a table indicating an example of relationships among gesture input guidance items displayed by the gesture input guidance item display controller 110, setting content guidance items displayed by the setting content guidance item display controller 112, and the contents of settings set by the setting unit 106. In the input guidance column of the table shown in FIG. 10, gesture input guidance items and print setting information are displayed.

In accordance with an effective gesture list, the gesture input guidance item display controller 110 displays in the display section 80 input guidance display items associated with contents of settings shown in FIG. 10 that may be set on the basis of a current setting status.

In accordance with a setting content guidance list, the setting content guidance item display controller 112 displays in the display section 80, among the setting content guidance items shown in FIG. 10, setting content guidance items associated with the gesture input guidance items displayed by the gesture input guidance item display controller 110.

The setting unit 106 stores therein position information associated with the gesture input guidance items shown in FIG. 10 as predetermined position information (representing gestures). The setting unit 106 compares position information indicating a gesture input from the receiver 104 with this predetermined position information and sets a corresponding setting content.

The setting information display controller 114 performs control on the basis of print setting information obtained from the setting unit 106 so that print setting information indicating a print setting status is displayed. As the print setting information, an image to be printed may be displayed.

As the print setting information which has been set by the setting unit 106, the designs of the setting content guidance items shown in FIG. 10 may be displayed. Additionally, by performing the same gesture as that for setting a certain setting, that setting may be reset. This will be discussed later with reference to FIGS. 11A and 11B.

Figure 11A:
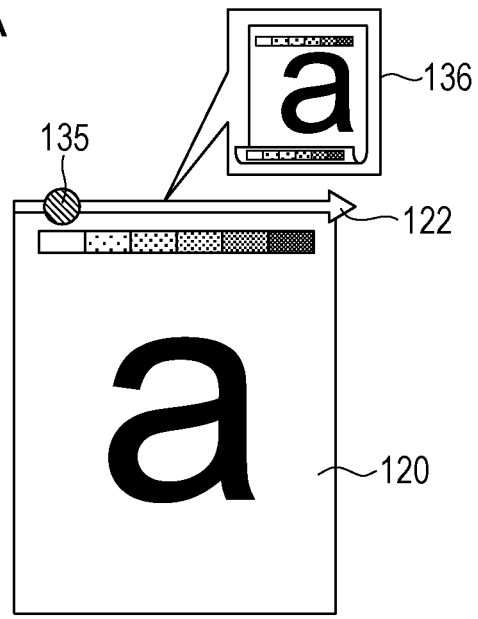
FIGS. 11A and 11B are plan views illustrating print setting information displayed by a setting information display controller.
Figure 11B:
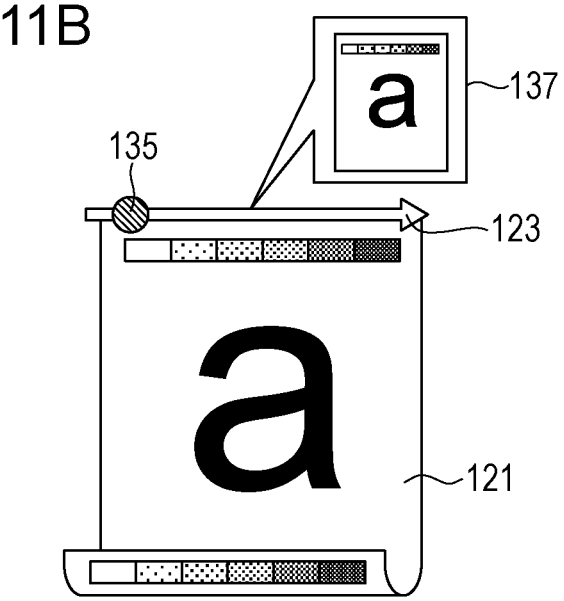

FIGS. 11A and 11B are plan views illustrating print setting information displayed by the setting information display controller 114.

In the example shown in FIG. 11A, the setting information display controller 114 displays the image 120 corresponding to print setting information indicating a print setting status. The image 120 corresponding to the print setting information indicates an initial print setting status. On the basis of a touch position 135, which is a position input by an operator, the gesture input guidance item display controller 110 displays the gesture input guidance item 122, and the setting content guidance item display controller 112 displays the setting content guidance item 136 associated with a gesture corresponding to the gesture input guidance item 122.

When an operator inputs a gesture corresponding to the gesture input guidance item 122, the setting unit 106 sets "duplex printing (short-edge binding)" represented by the setting content guidance item 136. Then, as shown in FIG. 11B, the setting information display controller 114 displays an image 121 corresponding to print setting information. In this state, when the operator touches the touch position 135, the gesture input guidance item display controller 110 displays a gesture input guidance item 123, and the setting content guidance item display controller 112 displays a setting content guidance item 137 as the setting content associated with the gesture corresponding to the gesture input guidance item 123.

When the operator further inputs a gesture corresponding to the gesture input guidance item 123, the setting unit 106 resets the duplex printing (short-edge binding) setting.

If the setting unit 106 sets the "change (enlarge) paper size" or "change (shrink) paper size" setting, the setting information display controller 114 may display an enlarged or shrunk image corresponding to the print setting information in accordance with the setting.

The display control unit 108 is configured as described above. The display control unit 108 may be configured to alternately display gesture input guidance items that at least partially overlap each other.

Figure 12A:
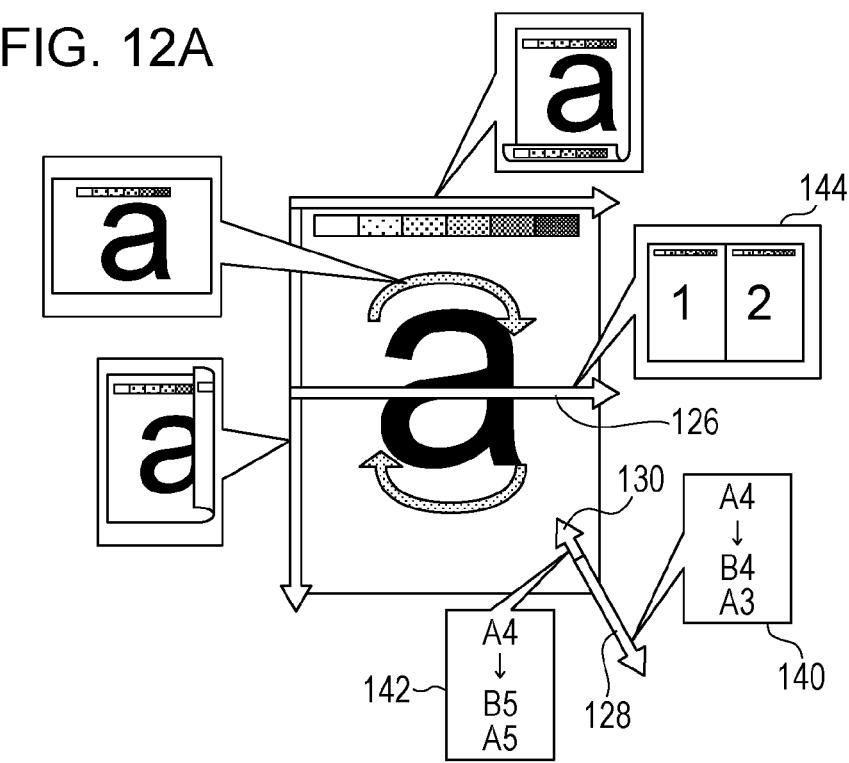
FIGS. 12A and 12B are plan views illustrating at least partially overlapping input guidance items that are alternately displayed by a display control unit.
Figure 12B:
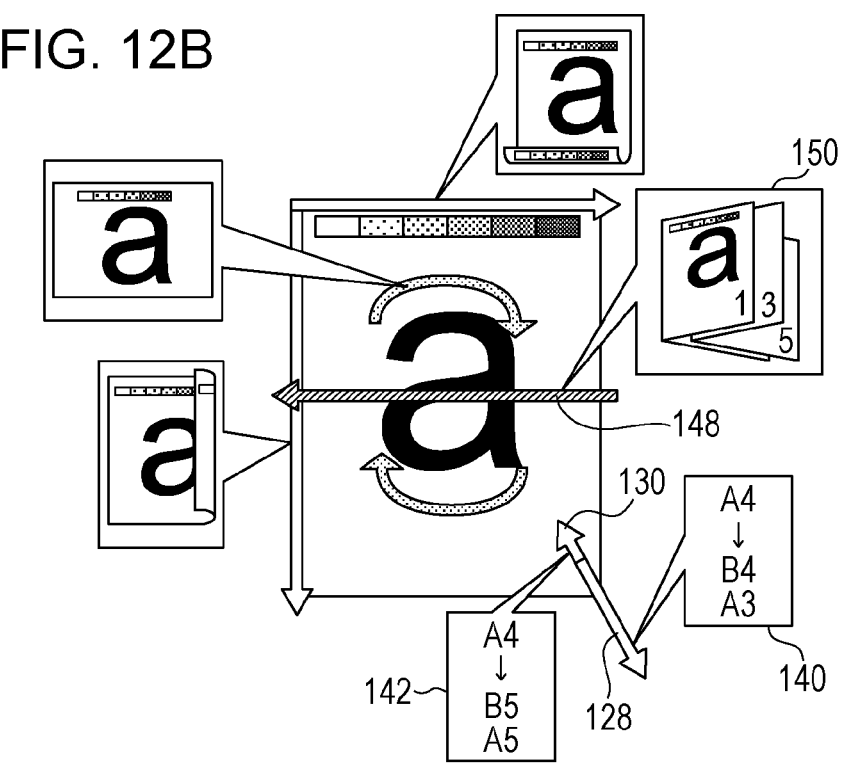

FIGS. 12A and 12B are plan views illustrating at least partially overlapping input guidance items that are alternately displayed by the display control unit 108.

As shown in FIGS. 12A and 12B, the display positions of the gesture input guidance item 126 and an input guidance item 148 overlap each other. In this case, the display control unit 108 alternately displays overlapping input guidance items, i.e., the gesture input guidance items 126 and 148 shown in FIGS. 12A and 12B, respectively. At least partially overlapping gesture input guidance items may be displayed in different colors.

In accordance with alternate displaying of at least partially overlapping input guidance items, the setting content guidance item 144 and a setting content guidance item 150 associated with the gesture input guidance items 126 and 148, respectively, are also alternately displayed, as shown in FIGS. 12A and 12B, respectively.

In this case, the gesture input guidance item display controller 110 switches among overlapping input guidance items after a predetermined time has elapsed after the previous gesture input guidance item was displayed.

For example, an alternate display flag indicating which gesture input guidance item is to be displayed among overlapping gesture input guidance items is provided. The gesture input guidance item display controller 110 displays a gesture input guidance item by referring to the alternate display flag and updates information concerning the alternate display flag every time a predetermined time elapses.

It is noted that some overlapping gesture input guidance items, such as the gesture input guidance items 128 and 130 shown in FIGS. 12A and 12B, do not have to be alternately displayed.

Figure 13:
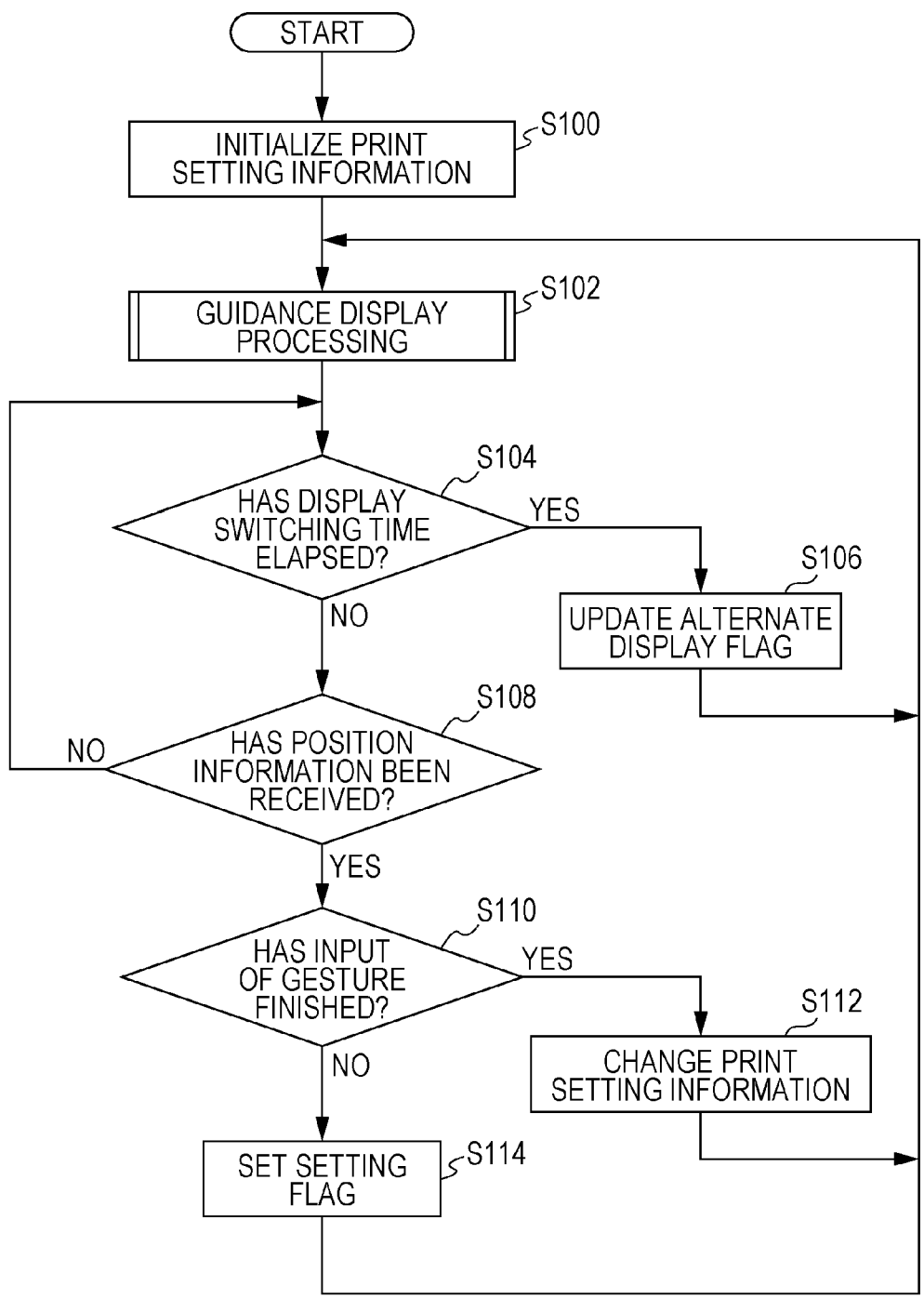
FIG. 13 is a flowchart illustrating an operation of a print setting section.
Figure 14:
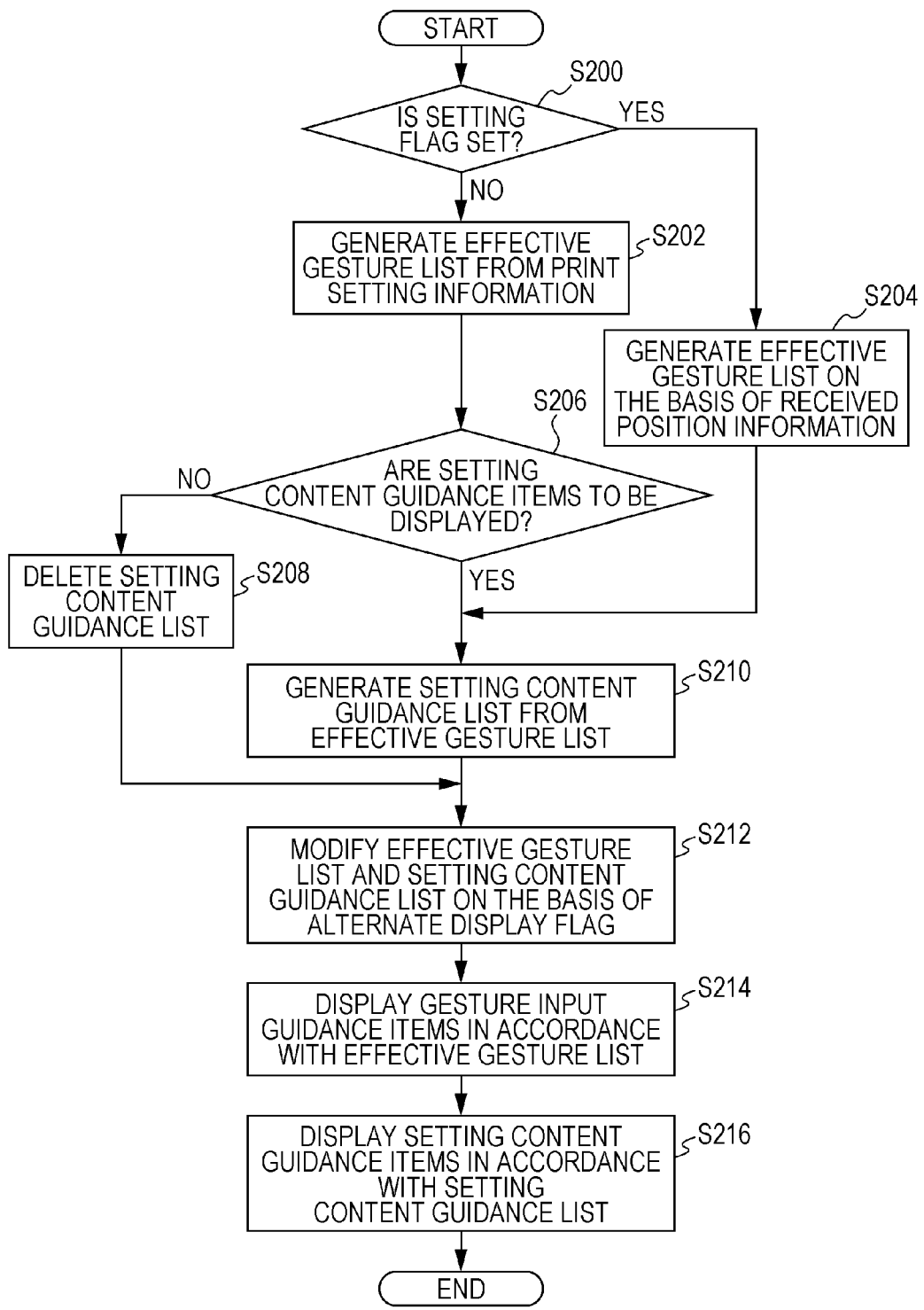
FIG. 14 is a flowchart illustrating guidance display processing.

An operation of the print setting section 90 of the information processing apparatus 6 will be described below. FIGS. 13 and 14 are flowcharts illustrating the operation of the print setting section 90 of the information processing apparatus 6. The operation of the print setting section 102 of the image forming apparatus 4 is similar to the print setting section 90 of the information processing apparatus 6, and an explanation thereof will thus be omitted.

In step S100, the setting unit 106 initializes print setting information, and the process then proceeds to step S102.

In step S102, guidance display processing, which will be discussed later, is performed. The process then proceeds to step S104.

In step S104, the gesture input guidance item display controller 110 determines whether a predetermined time for alternately displaying overlapping input display items has elapsed. If the predetermined time has elapsed, the process proceeds to step S106. If the predetermined time has not elapsed, the process proceeds to step S108.

In step S106, the gesture input guidance item display controller 110 updates information concerning the alternate display flag to switch from a currently displayed gesture input guidance item to another input guidance item. The process then returns to step S102.

In step S108, the receiver 104 determines whether position information has been received from the user interface device 76 (whether there is an input from an operator by touching the user interface device 76). If position information has been received, the receiver 104 outputs position information to the gesture input guidance item display controller 110, and the process proceeds to step S110. If position information has not been received, the process returns to step S104.

In step S110, the receiver 104 determines whether the input of a gesture performed on the user interface device 76 by the operator has finished. If it is determined that the input of a gesture has finished, the receiver 104 outputs position information to the setting unit 106, and the process proceeds to step S112. If it is determined that the input of a gesture has not finished, the process proceeds to step S114.

In step S112, the setting unit 106 sets, as print setting contents, the contents of settings associated with the position information input from the receiver 104, and outputs the print setting contents to the page data storage section 88 and the print parameter storage section 92. The setting unit 106 also outputs the contents of the current settings to the setting information display controller 114 as print setting information. The process then returns to step S102.

In step S114, the receiver 104 sets a setting flag, and the process returns to step S102.

The guidance display processing in step S102 will now be discussed below with reference to the flowchart of FIG. 14.

In step S200, the gesture input guidance item display controller 110 determines whether position information has been obtained from the receiver 104 by checking a setting flag. If a setting flag is not set, the process proceeds to step S202. If a setting flag is set, the process proceeds to step S204.

In step S202, the gesture input guidance item display controller 110 obtains print setting information indicating a current setting status from the setting unit 106, and generates an effective gesture list on the basis of the print setting information. The process then proceeds to step S206.

In step S204, the gesture input guidance item display controller 110 obtains print setting information indicating a current setting status from the setting unit 106, and generates an effective gesture list on the basis of the print setting information. Then, among gestures contained in the effective gesture list, the gesture input guidance item display controller 110 removes gestures that are not associated with the position information received from the receiver 104 from the effective gesture list. The process then proceeds to step S210.

In step S206, the setting content guidance item display controller 112 determines whether a setting has been set so that setting content guidance items are not displayed if the gesture input guidance item display controller 110 has not obtained position information from the receiver 104. If the above-described setting has been set, the process proceeds to step S208. If the above-described setting has not been set, the process proceeds to step S210.

In step S208, the setting content guidance item display controller 112 deletes a setting content guidance list, and the process then proceeds to step S212.

In step S210, the setting content guidance item display controller 112 lists setting content guidance items associated with gestures listed in the effective gesture list generated by the gesture input guidance item display controller 110, thereby generating a setting content guidance list. The process then proceeds to step S212.

In step S212, the gesture input guidance item display controller 110 refers to the alternate display flag and removes, from the effective gesture list, gesture input guidance items which are not display targets among overlapping gesture input guidance items. The setting content guidance item display controller 112 refers to the alternate display flag and removes, from the setting content guidance list, setting content guidance items associated with gesture input guidance items which are not display targets among overlapping gesture input guidance items. The process then proceeds to step S214.

In step S214, the gesture input guidance item display controller 110 displays in the display section 80 gesture input guidance items corresponding to gestures (position information) listed in the effective gesture list. The process then proceeds to step S216.

In step S216, the setting content guidance item display controller 112 displays in the display section 80 setting content guidance items listed in the setting content guidance list.

The guidance display processing in step S102 has been performed as described above.

A description will now be given of a second exemplary embodiment of the invention.

Figure 15:
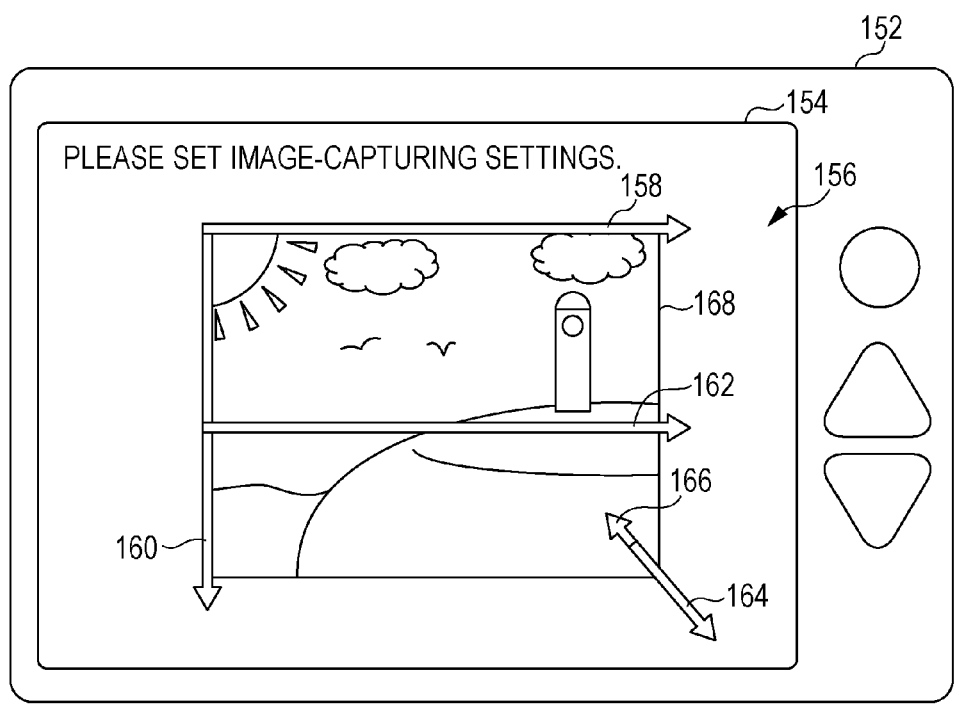
FIG. 15 is a plan view illustrating a digital camera according to a second exemplary embodiment of the invention.

FIG. 15 is a plan view illustrating a digital camera 152 according to the second exemplary embodiment. The digital camera 152, which is an example of an imaging apparatus, is configured to capture an image of a subject and thereby obtain a captured image. The digital camera 152 includes, as shown in FIG. 15, a display section 154 and a display area 156, and has a function similar to that of the user interface devices 10 and 76 of the first exemplary embodiment.

The digital camera 152 also includes a CPU, a memory, etc. (not shown), and part of the digital camera 152 serves as a computer and executes an information processing program similar to the above-described information processing program 64. In the second exemplary embodiment, a setting unit sets, as image-capturing setting contents, the contents of settings associated with position information received from a receiver.

According to the information processing program of the second exemplary embodiment, as shown in FIG. 15, a gesture input guidance item display controller displays gesture input guidance items 158 through 166 as an image-capturing setting initial state.

The display state shown in FIG. 15 is the initial state displayed by a display control unit when the setting unit sets image-capturing settings in the digital camera 152. In the display section 154 of the digital camera 152, when capturing an image of a subject, an image 168 corresponding to setting information indicating an image to be captured and a preview reflecting a current setting status is displayed in the entirety of the display area 156. When setting image-capturing settings, the image 168 is displayed in a reduced size, as shown in FIG. 15, so that an area for displaying input guidance items and setting content guidance items is secured.

Figure 16:
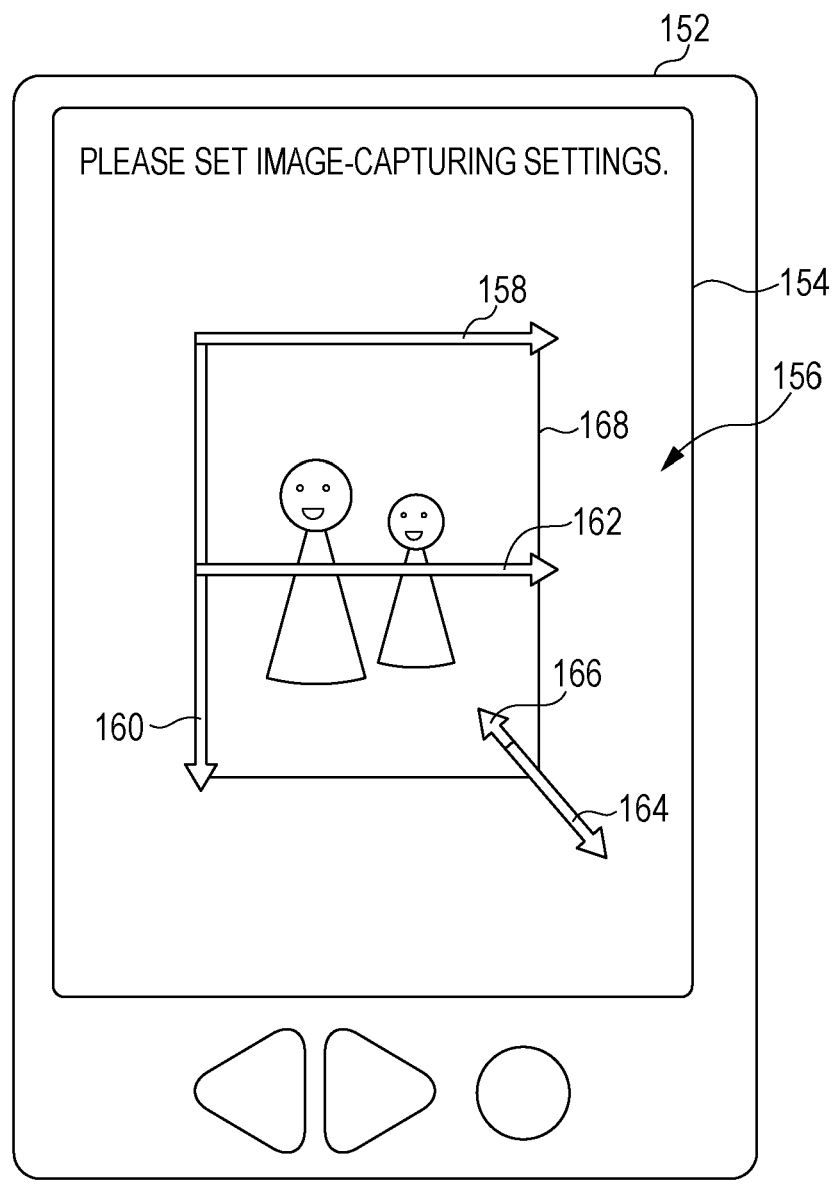
FIG. 16 is a plan view illustrating the digital camera rotated from the position shown in FIG. 15.

When an operator rotates the digital camera 152, as shown in FIG. 16, the gesture input guidance item display controller of the second exemplary embodiment also rotates the input guidance items 158 through 166 in accordance with the rotation of the digital camera 152.

FIG. 17 is a table indicating an example of relationships among gesture input guidance items, setting content guidance items, and the contents of settings.

In the second exemplary embodiment, as image-capturing settings, ISO speed, which is an 8 index of image-capturing sensitivity, white balance for adjusting color casts of captured images, image-capturing mode (character image-capturing mode and landscape image-capturing mode), and the number of pixels can be set. As shown in FIG. 17, gesture input guidance items and setting content guidance items are associated with the corresponding settings. In this example, the setting of the image-capturing mode is performed with a view to obtaining a captured image with a predetermined setting suitable for the type of subject. For example, if the character image-capturing mode is set, a captured image is obtained in accordance with a setting suitable for imaging characters. If the landscape image-capturing mode is set, a captured image is obtained in accordance with a setting suitable for imaging landscapes.

Figure 18A:
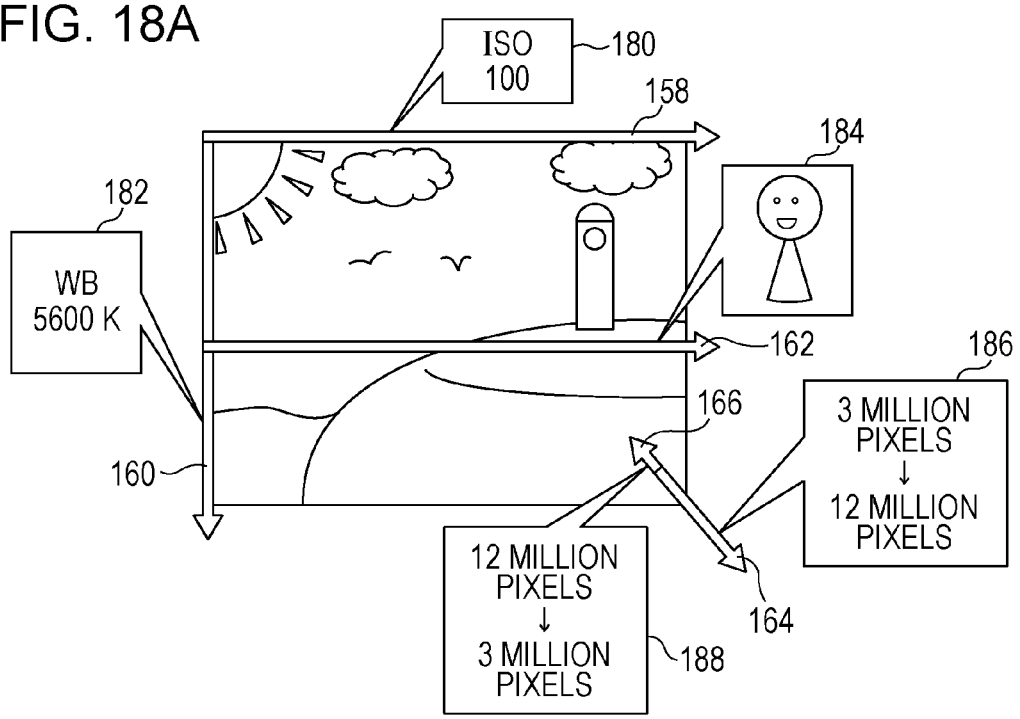
FIGS. 18A and 18B are plan views illustrating gesture input guidance items, setting content guidance items, and print setting information to be displayed in accordance with an information processing program of the second exemplary embodiment.
Figure 18B:
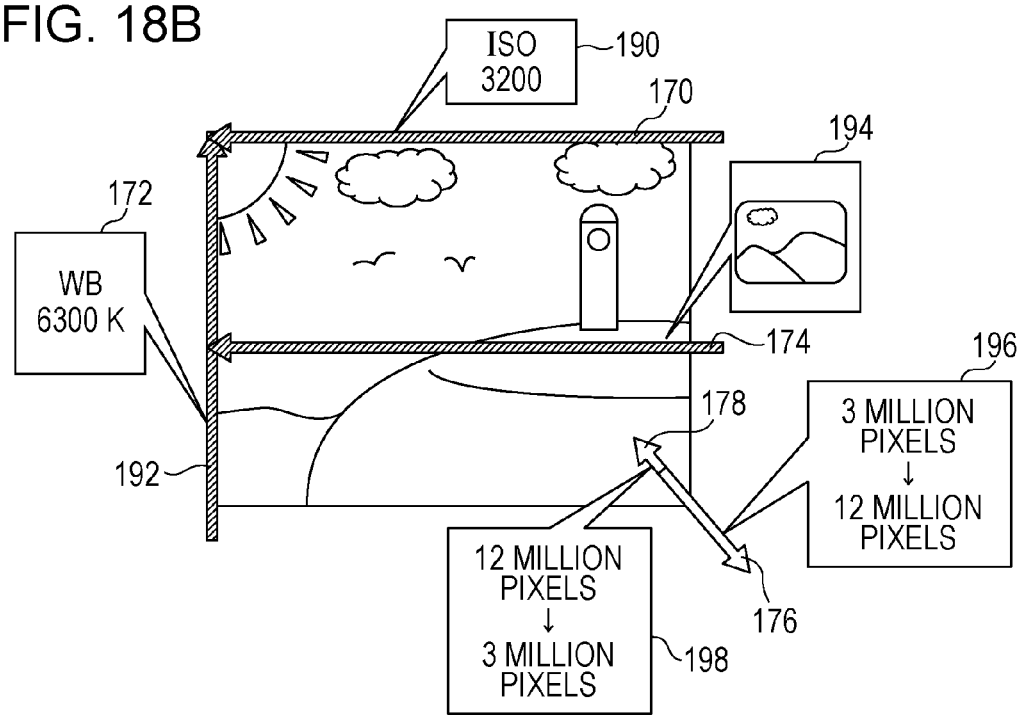

FIGS. 18A and 18B are plan views illustrating gesture input guidance items, setting content guidance items, and print setting information to be displayed in accordance with the information processing program of the second exemplary embodiment.

On the basis of the relationships shown in FIG. 17, gesture input guidance items 158 through 166 and 170 through 178 and setting content guidance items 180 through 198 are displayed, as shown in FIGS. 18A and 18B. The display positions of the gesture input guidance items 158 through 166 overlap those of the gesture input guidance items 170 through 178, respectively. Accordingly, the information processing program alternately displays the image shown in FIG. 18A and the image shown in FIG. 18B. The overlapping gesture input guidance items are displayed also in different colors.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An input display apparatus comprising:
a display unit that has a display area;
a receiver configured to receive a plurality of gestures which are performed on the display area;
a setting unit configured to set a plurality of settings for an apparatus in response to gestures being received by the receiver; and
a display controller configured to control the display unit to display at least one of the plurality of settings together with gesture guidance information for guiding subsequent performance of at least one of the plurality of gestures, reception of which by the receiver would cause the setting unit to set the displayed at least one of the plurality of settings,
wherein the display controller is configured to control the display unit to display first gesture guidance information and second gesture guidance information alternately at a predetermined time interval, in response to determining that the first gesture guidance information at least partially overlaps the second gesture guidance information.

2. The input display apparatus according to claim 1, wherein the display controller is configured to control the display unit to display the at least one of the plurality of settings together with the gesture guidance information, in response to determining that only a part of the at least one of the plurality of gestures has been performed on the display area.

3. The input display apparatus according to claim 1, wherein the display controller is configured to control the display unit to display information reflecting a setting in response to the setting being set by the setting unit.

4. The input display apparatus according to claim 1, wherein the display controller is configured to control the display unit to refrain from displaying a setting that is not possible to be set by the setting unit.

5. The input display apparatus according to claim 1, wherein the display controller is configured to control the display unit to select the at least one of the plurality of settings and the gesture guidance information that are displayed in accordance with a frequency with which the at least one of the plurality of settings is set by the setting unit.

6. An input display apparatus according to claim 1,
wherein the display controller is configured to control the display unit to display first gesture guidance information and second gesture guidance information in different colors.

7. The input display apparatus according to claim 6, wherein the display controller is configured to control the display unit to display first gesture guidance information and second gesture guidance information in different colors, in response to determining that the first gesture guidance information at least partially overlaps the second gesture guidance information.

8. The input display apparatus according to claim 1, wherein the display controller is configured to control the display unit to display a setting and the gesture guidance information which is associated with the setting, if the setting and the gesture guidance information are set as a display target.

9. An imaging apparatus comprising:
a display unit that has a display area;
a receiver configured to receive a plurality of gestures which are performed on the display area;
a setting unit configured to set a plurality of settings for an apparatus in response to gestures being received by the receiver;
a display controller configured to control the display unit to display at least one of the plurality of settings together with gesture guidance information for guiding subsequent performance of at least one of the plurality of gestures, reception of which by the receiver would cause the setting unit to set the displayed at least one of the plurality of settings; and
an image obtaining unit configured to capture an image of a subject using a setting set by the setting unit so as to obtain a captured image, wherein the plurality of settings comprises:
a setting for setting image-capturing sensitivity;
a setting for setting a correction amount by which color casts of a captured image are to be corrected;
a setting for performing setting so that a captured image is obtained in accordance with a content of a predetermined setting suitable for a subject; and a setting for setting the number of pixels of a captured image.

10. An input display apparatus comprising:
a display unit that has a display area;
a receiver configured to receive a plurality of gestures which are performed on the display area;
a setting unit configured to set a plurality of settings for an apparatus in accordance with the gestures received by the receiver; and
a display controller configured to control the display unit to display at least one of the plurality of settings and gesture guidance information for guiding a performance of a gesture which is associated with the setting to be displayed,
wherein the display controller is configured to control the display unit to display first gesture guidance information and second gesture guidance information alternately at a predetermined time interval, in response to determining that the first gesture guidance information at least partially overlaps the second gesture guidance information.

11. An imaging apparatus comprising:
a display unit that has a display area;
a receiver configured to receive a plurality of gestures which are performed on the display area;
a setting unit configured to set a plurality of settings for an apparatus in accordance with the gestures received by the receiver;
a display controller configured to control the display unit to display at least one of the plurality of settings and gesture guidance information for guiding a performance of a gesture which is associated with the setting to be displayed; and
an image obtaining unit configured to capture an image of a subject using a setting set by the setting unit so as to obtain a captured image,
wherein the plurality of settings comprises:
a setting for setting image-capturing sensitivity;
a setting for setting a correction amount by which color casts of a captured image are to be corrected;
a setting for performing setting so that a captured image is obtained in accordance with a content of a predetermined setting suitable for a subject; and
a setting for setting the number of pixels of a captured image.

12. An input display apparatus comprising:
a display unit that has a display area;
a receiver configured to receive a plurality of gestures which are performed on the display area;
a setting unit configured to set a plurality of settings for an apparatus in response to gestures being received by the receiver; and
a display controller configured to control the display unit to display at least one of the plurality of settings together with gesture guidance information for guiding subsequent performance of at least one of the plurality of gestures, reception of which by the receiver would cause the setting unit to set the displayed at least one of the plurality of settings,
wherein the receiver is configured to, in response to an input being performed on the display area, send position information to the display controller, and
wherein the display controller is configured to, in response to the sent position information, remove from being displayed on the display unit at least one of the plurality of settings together with gesture guidance information not associated with the sent position information.

13. The input display apparatus according to claim 12 further comprising:
a printer configured to print an image using a setting set by the setting unit.

14. The input display apparatus according to claim 12, wherein the plurality of settings comprises:
a setting for performing duplex printing with short-edge binding;
a setting for performing duplex printing with long-edge binding;
a setting for printing images for two pages per sheet;
a setting for performing booklet printing;
a setting for performing printing after changing an orientation of a document;
a setting for performing printing after enlarging a size of a sheet to be output; and
a setting for performing printing after shrinking a size of a sheet to be output.

15. The input display apparatus according to claim 12 further comprising
an image obtaining unit configured to capture an image of a subject using a setting set by the setting unit so as to obtain a captured image.

16. A non-transitory computer readable medium storing a program causing a computer to execute a process, the process comprising:
controlling a display unit to display, on the display area, at least one of a plurality of settings for an apparatus together with gesture guidance information for guiding subsequent performance of at least one of a plurality of gestures on the display area;
receiving the at least one of the plurality of gestures, which has been subsequently performed on the display area; and
setting the at least one of the plurality of settings in response to the at least one of the plurality of gestures being received, wherein the process further comprises:
in response to an input being performed on the display area, sending position information; and
in response to the sent position information, removing from being displayed on the display unit at least one of the plurality of settings together with gesture guidance information not associated with the sent position information.

* * * * *